(12) United States Patent
Futin et al.

(10) Patent No.: US 10,706,976 B2
(45) Date of Patent: Jul. 7, 2020

(54) ASSEMBLY FOR ACTING ON THE OUTER SURFACE OF A TUBE, AND CORRESPONDING METHOD

(71) Applicant: AREVA NP, Courbevoie (FR)

(72) Inventors: Emmanuel Futin, Crissey (FR);
Olivier Berne, Saint-Marcel (FR);
Daniel Grypczynski, Lyons (FR)

(73) Assignee: AREVA NP, Courbevoie (FR)

( * ) Notice: Subject to any disclaimer, the term of this patent is extended or adjusted under 35 U.S.C. 154(b) by 390 days.

(21) Appl. No.: 15/508,481

(22) PCT Filed: Sep. 1, 2015

(86) PCT No.: PCT/EP2015/069887
§ 371 (c)(1),
(2) Date: Mar. 2, 2017

(87) PCT Pub. No.: WO2016/034550
PCT Pub. Date: Mar. 10, 2016

(65) Prior Publication Data
US 2017/0278587 A1    Sep. 28, 2017

(30) Foreign Application Priority Data

Sep. 3, 2014    (FR) .................................... 14 58232

(51) Int. Cl.
*G21C 17/00* (2006.01)
*G21C 17/017* (2006.01)
*F16L 55/18* (2006.01)
*G21C 19/20* (2006.01)
(Continued)

(52) U.S. Cl.
CPC ............ *G21C 17/017* (2013.01); *F16L 55/18* (2013.01); *G01N 29/14* (2013.01); *G01N 29/225* (2013.01); *G21C 19/207* (2013.01)

(58) Field of Classification Search
CPC ...... G21C 17/00; G21C 17/017; G21C 19/20; G21C 19/207; G01N 29/14; G01N 29/22; G01N 29/225
See application file for complete search history.

(56) References Cited

U.S. PATENT DOCUMENTS 1,594,518 A  *  8/1926  Hathaway .................. F28G 3/10
                                                     15/104.04
3,511,091 A     5/1970  Thome
(Continued)

FOREIGN PATENT DOCUMENTS

FR          1448295 A      8/1966
FR          2780907 A1     1/2000
KR       2013 0008839      1/2013

OTHER PUBLICATIONS

Search Report of corresponding PCT International Application.

*Primary Examiner* — Marshall P O'Connor
(74) *Attorney, Agent, or Firm* — Davidson, Davidson & Kappel, LLC (57) ABSTRACT

An assembly for acting on the outer surface of a tube, and corresponding method are provided. The assembly includes a carrier; at least one inspection or maintenance tool; the carrier includes at least one rolling body; an actuator. The carrier further includes a device for connecting the carrier to the tube, arranged so that the tube absorbs at least 50% of the weight of the carrier and the tool.

17 Claims, 9 Drawing Sheets

(51) Int. Cl.
*G01N 29/22* (2006.01)
*G01N 29/14* (2006.01)

(56) References Cited

U.S. PATENT DOCUMENTS

2010/0275694 A1* 11/2010 Roberts ............... F17D 5/00
                       73/637
2014/0338472 A1  11/2014 Chang

* cited by examiner

ASSEMBLY FOR ACTING ON THE OUTER SURFACE OF A TUBE, AND CORRESPONDING METHOD

The invention generally relates to operations on the outer surfaces of tubes, in particular in hard-to-reach areas of a nuclear reactor.

More specifically, according to a first aspect, the invention relates to an assembly for acting on an outer surface of a tube, the assembly being of the type comprising:

a carrier movable along the tube;

at least one inspection or maintenance tool, connected to the carrier;

the carrier comprising:

at least one rolling body, placed in contact with the outer surface of the tube;

an actuator, arranged to rotate the rolling body relative to the tube, so as to propel the carrier along the tube by cooperation between the rolling body and the outer surface of the tube.

BACKGROUND

FR 1,448,295 describes an assembly of this type. The carrier is supported by an axle mounted along the tube, so as to be able to move the carriage and inspect the various parts of the tube.

Such an assembly is complex to implement.

SUMMARY OF THE INVENTION

In this context, the invention aims to propose an assembly that is easier to use.

To that end, the invention relates to an assembly of the aforementioned type, characterized in that the carrier further comprises a device for connecting the carrier to the tube, arranged so that the tube absorbs at least 50% of the weight of the carrier and the tool.

Thus, the carrier of the operating assembly is supported by the tube to be inspected, and progresses along this tube via rolling bodies cooperating with the outer surface of the tube. It is therefore not necessary for the assembly to include an exterior structure making it possible to guide or support the carrier.

Furthermore, because the carrier is supported by the tube to be inspected, it naturally follows the trajectory of this tube. The guiding of the carrier along the tube is therefore greatly simplified, especially when the tube has bowed sections.

The assembly may also have one or more of the features below, considered individually or according to any technically possible combinations:

the carrier comprises a chassis to which the or each rolling body is connected, the device for connecting the carrier to the tube comprising at least one roller connected to the chassis, arranged so as to pinch the tube between the or each roller and the or each rolling body with a predetermined force;

the or each rolling body has a nonslip coating, said nonslip coating, said predetermined force and a maximum motor torque that may be transmitted by the actuator to the or each rolling body being chosen so that the carrier and the tool can be kept immobile around a vertical tube segment;

the device for connecting the carrier to the tube includes at least one gripper bearing at least the or one of the rollers, and a connection of the gripper to the chassis arranged so that the gripper is movable between an open position in which the carrier can be separated from the tube, and a closed position in which the tube is pinched between the or each roller and the or each rolling body;

the carrier comprises a coder suitable for determining a current position of the carrier along the tube;

the assembly comprises a connection suitable for connecting the carrier to the or each tool, said connector imparting at least one degree of freedom to the or each tool relative to the carrier;

one of the tools is a brushing tool including at least one brush arranged to brush the outer surface of the tube;

the brushing tool includes several brushes having half-ring shapes, diametrically opposite one another relative to the tube;

one of the tools is an inspection tool including at least one camera, arranged to inspect the outer surface of the tube;

the inspection tool includes a device for marking the outer surface;

one of the tools is a machining tool including at least one machining device able to machine the outer surface of the tube, preferably two machining devices that are diametrically opposite relative to the tube;

the machining tool includes:

a frame;

a plurality of guide rollers connected to the frame, arranged to cooperate with the tube such that the machining tool is supported by the tube and is able to move along the tube;

a carriage carrying the or each machining device;

a connection of the carriage to the frame, arranged so that the carriage is translatable relative to the frame along the tube and rotatable around the tube;

the machining tool includes connections of the rollers to the frame, at least some connections being able to move the rollers between respective positions separated from the tube, and respective positions in contact with the outer surface of the tube;

the or each machining device includes a machining member and a connection of the machining device to the carriage able to tilt the machining member relative to the carriage in a plane perpendicular to the tube so as to place the machining member in contact with the outer surface of the tube; and the machining tool includes at least one clamp able to reversibly lock the machining tool in position on the tube.

According to a second aspect, the invention relates to a method for acting on an outer surface of a tube using an assembly having the above features, the method comprising at least the following steps:

placing the carrier and the tool connected to the carrier on the tube;

moving the carrier and the tool along the tube;

performing at least one inspection or maintenance operation on the outer surface of the tube with the tool.

The method may further comprise one or more of the following steps:

brushing the outer surface of the tube using a brushing tool connected to the carrier;

inspecting the outer surface of the tube using an inspection tool connected to the carrier;

marking the outer surface of the tube using an inspection tool connected to the carrier;

machining the outer surface of the tube using a machining tool connected to the carrier.

BRIEF SUMMARY OF THE DRAWINGS

Other features and advantages of the invention will emerge from the following detailed description, provided for information and non-limitingly, in reference to the appended figures, in which.

DETAILED DESCRIPTION

The assembly shown in the figures is provided to act on the outer surfaces of tubes, in hard-to-reach zones where manual operations cannot be done practically. Typically, the assembly is provided to perform inspection and/or maintenance operations on nuclear reactor tubes situated in a hostile environment, where the dose rate is very high. These operations in particular seek to restore tubes 1 whose outer surfaces 2 are damaged.

For example, the tubes are the guide tubes for the probes of the in-core reactor instrumentation (IRI) type.

Figure 1:
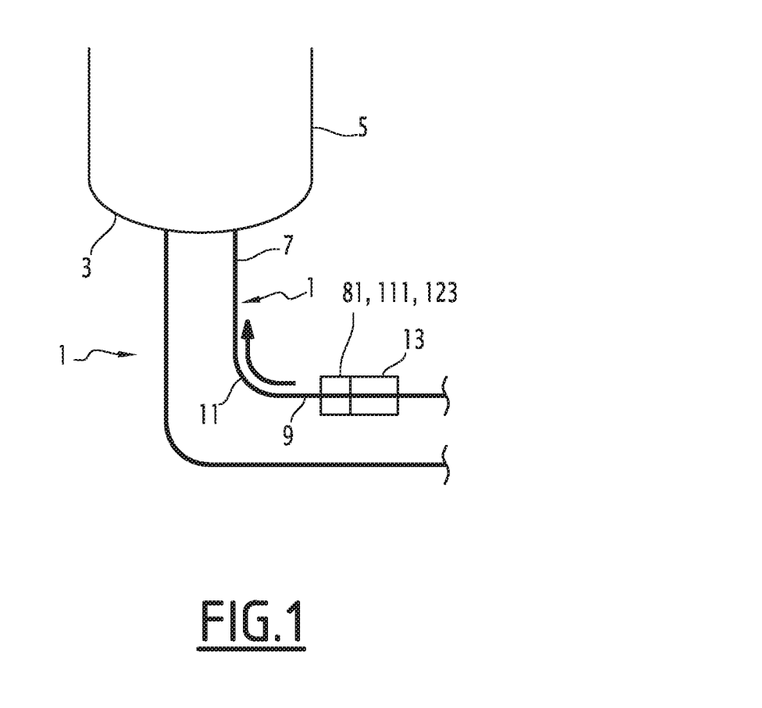
FIG. 1 is a simplified schematic illustration of a nuclear reactor vessel of the PWR type, and guide tubes for probes of the IRI system, the operating assembly according to an embodiment of the invention being shown mounted on one of the tubes.

As illustrated in FIG. 1, the guide tubes 1 of the IRI system traverse the bottom 3 of the vessel 5 of the reactor. They allow probes to be inserted inside the vessel 5, in particular probes measuring the neutron flux. The tubes 1 each include a substantially vertical part 7 and at least one substantially horizontal part 9, connected to one another by a bent segment 11.

The parts of the tubes 1 situated immediately below the bottom 3 are situated in an environment where the dose rate is very high, making manual acts difficult.

The operating assembly makes it possible to perform inspection and/or maintenance operations on the upper surface 2 of the guide tubes 1, for example when these surfaces are corroded or damaged for any other reason.

However, the operating assembly 1 may be used for maintenance of any type of tube, inside a nuclear reactor, or in another type of nuclear installation, or even in a non-nuclear installation. It makes it possible to carry out operations in an essentially automated work mode, with very limited human intervention.

In the following description, the "longitudinal direction" refers to the direction of the central axis of the tube.

Figure 3:
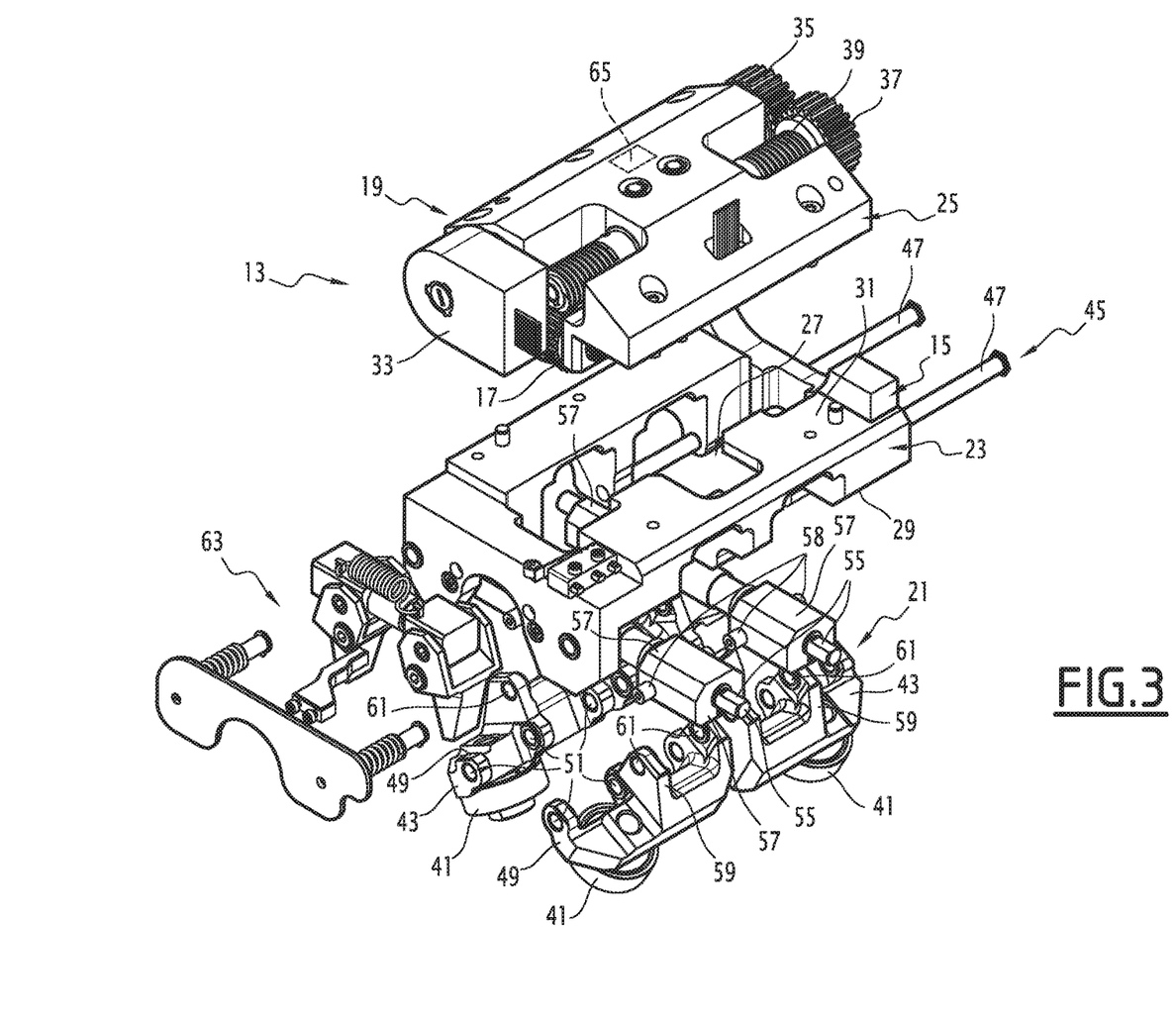
FIG. 3 is an exploded perspective view of the carrier of the operating assembly of FIGS. 1 and 2.
Figure 4:
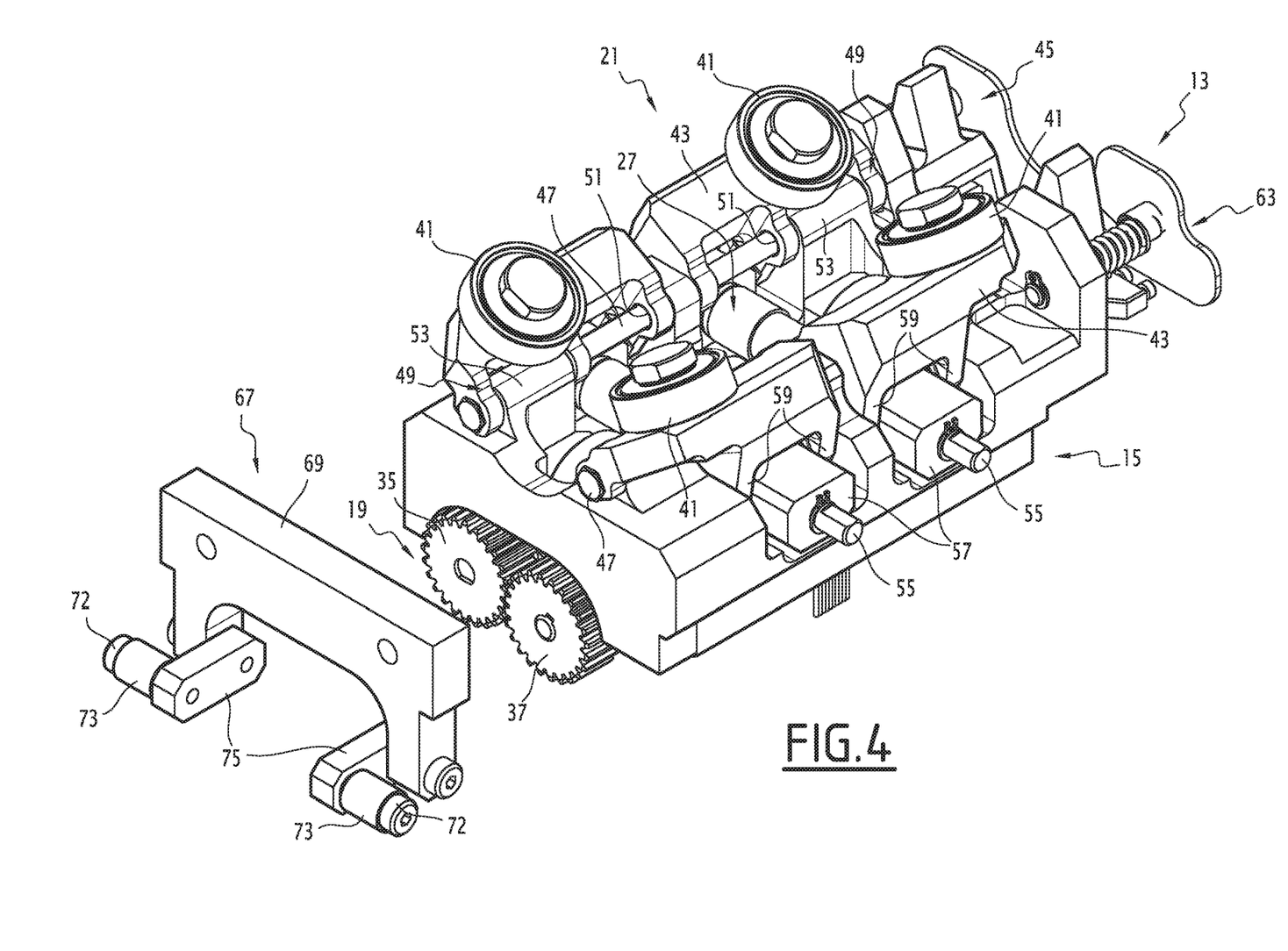
FIG. 4 is a perspective view of the carrier in the assembled state.

The operating assembly includes a carrier 13 movable along the tube, shown in FIGS. 3 and 4, and at least one inspection or maintenance tool for the outer surface of the tube, connected to the carrier 13.

Typically, the assembly includes several tools, making it possible to perform different types of operation on the outer surface of the tube: brushing, video inspection, marking of zones to be treated, gouging—i.e., machining—damaged zones of the outer surface of the tube.

These various tools are shown in FIGS. 5 to 9. They can be mounted on the same carrier, one after another.

As shown in FIGS. 3 and 4, the carrier 13 comprises:

a chassis 15;

at least one rolling body 17 connected to the chassis 15, placed in contact with the outer surface 2 of the tube 1;

an actuator 19, arranged to rotate the rolling body 17 relative to the tube, so as to propel the carrier along the tube by cooperation between the rolling body 17 and the outer surface 2 of the tube 1;

a connecting device 21 connecting the carrier 13 to the tube 1.

Typically, the carrier 13 includes two rolling bodies 17. These rolling bodies are for example rollers. They rotate around respective transverse axes, perpendicular to the central longitudinal axis of the tube 1.

The chassis 15, as shown in FIG. 3, includes two parts assembled to one another detachably, a frame 23 and a bottom 25. The frame 23 inwardly defines a hollow volume 27, in which the rolling bodies 17 are housed.

The bottom 25 bears the rolling bodies 17 and the actuator 19.

The frame 23 is defined by first and second large faces 29 and 31 opposite one another. The volume 27 completely traverses the frame 23, and emerges at the two large faces 29 and 31. The bottom 25 is attached on the second large face 31 and closes off the volume 27 at this second large face 31.

The actuator 19 includes a motor 33 whose output shaft rotates a pinion 35. The actuator 19 also includes a toothed wheel 37 meshing with the pinion 35, rigidly fastened to a screw 39. The screw 39 is connected to the chassis 15. More specifically, it is connected to the bottom 25. The screw 39 rotates the rolling body or bodies 17.

The device 21 connecting the carrier 13 to the tube is arranged so that the tube 1 absorbs at least 50% of the weight of the carrier and the tool connected to the carrier, when the latter are mounted on the tube. Typically, the tube 1 absorbs 100% of the weight of the carrier and the tool.

The connecting device 21 includes at least one roller 41 connected to the chassis 15, arranged so as to pinch the tube between the or each roller 41 and the or each rolling body 17, with a predetermined force.

In the illustrated example, the connecting device 21 includes four rollers 41. Alternatively, the connecting device 21 can include fewer than four rollers, for example one roller, two rollers or three rollers, or more than four rollers.

As shown in FIG. 3, the connecting device 21 includes one or several grippers 43, each carrying at least one roller 41.

In the illustrated example, the connecting device 21 includes two moving grippers 43, each carrying two rollers 41.

Figure 2:
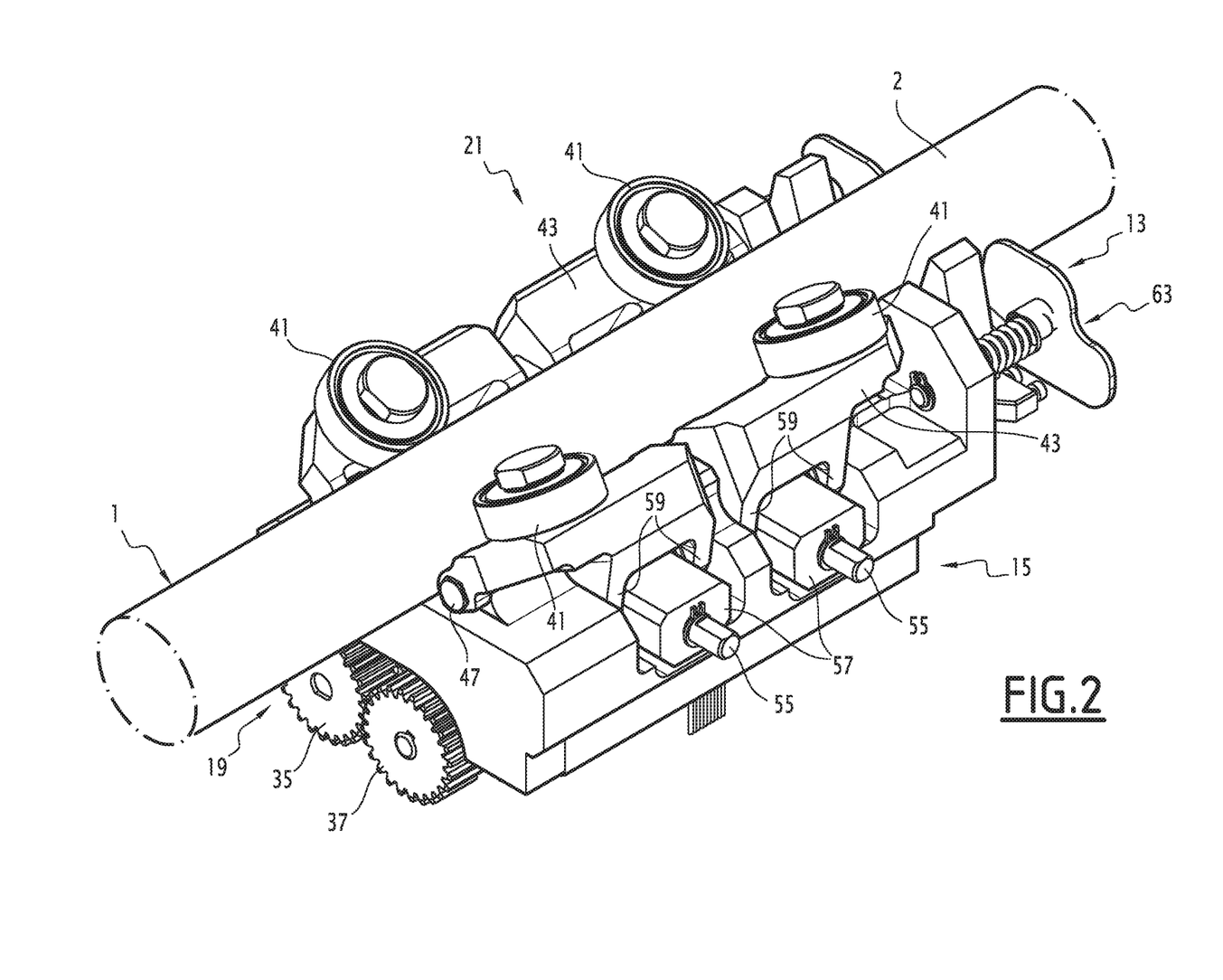
FIG. 2 is an enlarged perspective view of the carrier of the assembly according to an embodiment of the invention in place on one of the guide tubes.

The device 21 for connecting the carrier to the tube further includes at least one connection 45 of each gripper 43 to the chassis 15, arranged so that the gripper 43 is movable between an open position in which the carrier can be separated from the tube, and a closed position in which the tube is pinched between the or each roller 41 carried by the gripper and the rolling body or bodies 17 (FIG. 2).

The connection 45 includes an axle 47 for each gripper 43. The gripper 43 is thus pivotably connected to the frame 15 around the axle 47. The axle is oriented longitudinally.

As shown in FIG. 3, the gripper 43 includes several yokes 49, pierced with orifices 51 through which the axle 47 is engaged. The axle 47 is fastened to the frame 23 by foundations 53 pierced with longitudinal passages in which the axle 47 is engaged. The foundations 53 are integral with the frame 23 (FIG. 4).

In the illustrated example, the grippers 43 are mounted on the first large face 29 of the frame, and are positioned transversely on either side of the volume 27.

The connection 45 also includes two transverse screws 55, and on each screw 55, two blocks 57 movable along the corresponding screw.

Each block 57 has a tapped inner passage, in which the threaded shank of the screw 55 is engaged.

As shown in FIG. 3, each block 57 includes two axle ends 58 aligned with one another longitudinally, and protruding on either side of the block 57. Each gripper 43 includes two yokes 59, having orifices 61. Each yoke 59 is placed straddling a block 57, the axle ends 58 being engaged freely rotating in the orifices 61.

Furthermore, a compression spring (not shown) is inserted between each block 57 and a shoulder arranged on the corresponding screw. The spring stresses the block 57 toward the end of the screw, i.e., in the direction moving further away from the other block 57 mounted on the same screw.

The screws 55 and the blocks 57 are inserted between the first large face 29 and the grippers 43.

The connection 45 is arranged such that, when the screws 55 are rotated in a first direction, the blocks 57 are moved transversely toward one another, which causes the grippers 43 to move toward their respective open positions. Conversely, when the screws 55 are rotated in the opposite direction, the blocks 57 are moved along the screws 55 in the direction of an increasing separation of the two blocks, which drives the grippers 43 toward their respective closed positions.

The rolling body or bodies 17 are covered with a nonslip coating. This makes it possible to increase the adherence of the rolling body and the tube.

According to one advantageous aspect of the invention, the nonslip coating, the predetermined force with which the tube 1 is pinched between the roller(s) 41 and the or each rolling body 17, and the maximum drive torque that may be transmitted by the actuator 19 to the rolling bodies 17, are chosen so that the carrier and the tool can be kept immobile around a vertical tube segment, like the tube segment 7 shown in FIG. 1.

This makes it possible to act at any point of the tube, on horizontal segments, vertical segments, or segments having any orientation.

As in particular shown in FIG. 2, the carrier is provided to be mounted around the tube such that the rolling bodies 17 are placed vertically below the tube, and the rollers 41 above the tube, if the tube 1 is substantially horizontal.

Thus, the rolling bodies 17 and the rollers 41 are arranged diametrically opposite one another relative to the tube 1.

As shown in FIG. 3, the carrier also includes an end-of-travel detector 63, mounted at one longitudinal end of the chassis 15.

This detector 63 makes it possible to stop the movement of the carrier automatically when the latter abuts at one end of the tube.

The carrier also comprises a coder 65 (FIG. 3), suitable for determining the current position of the carrier along the tube. Thus, the position of the carrier along the tube, in particular relative to a fixed stop situated at one end of the tube, is perfectly known all throughout its movement on the tube owing to the information given by the encoder on board the carrier. This thus makes it possible to return, several times in a row if necessary, to a given position on the tube, to perform various operations needed to restore the outer surface of the tube.

The assembly includes a connection 67 provided to connect the carrier 13 to each of the tools. Thus, the same connection 67 makes it possible to connect each of the tools to the carrier.

As shown in FIG. 4, the connection 67 includes a platen 69 rigidly fastened to the carrier 13, at least one housing 71 connected to the tool (for example, see FIG. 6), at least one axle 72 connected to the platen 69 and engaged in the or a housing 71, and at least one elastic sleeve 73, inserted between the axle 72 and the housing 71.

The platen 69 is rigidly fastened to the chassis 15 of the carrier, preferably to a longitudinal end thereof opposite the end-of-travel detector 63.

In the illustrated example, the connection comprises two housings 71. They are arranged in blocks 74, fastened to the tool.

The axle(s) 72 are oriented transversely, like the housing(s) 71. They are rigidly fastened to the platen by spacers 75.

The elastic sleeve(s) 73 are slipped around the axle(s) 72. They are made from polyurethane, or rubber or any other suitable material.

Each sleeve 73 is adhered by a radially inner face to the axle 72, and by a radially outer face to the peripheral wall of the housing 71.

Due to the presence of the sleeve(s), the connection 67 between the carrier and the tool has sufficient flexibility to allow the tool to adopt an angle relative to the carrier. This allows the carrier/tool assembly to follow the segments on a curve of the tube 1.

Figure 5:
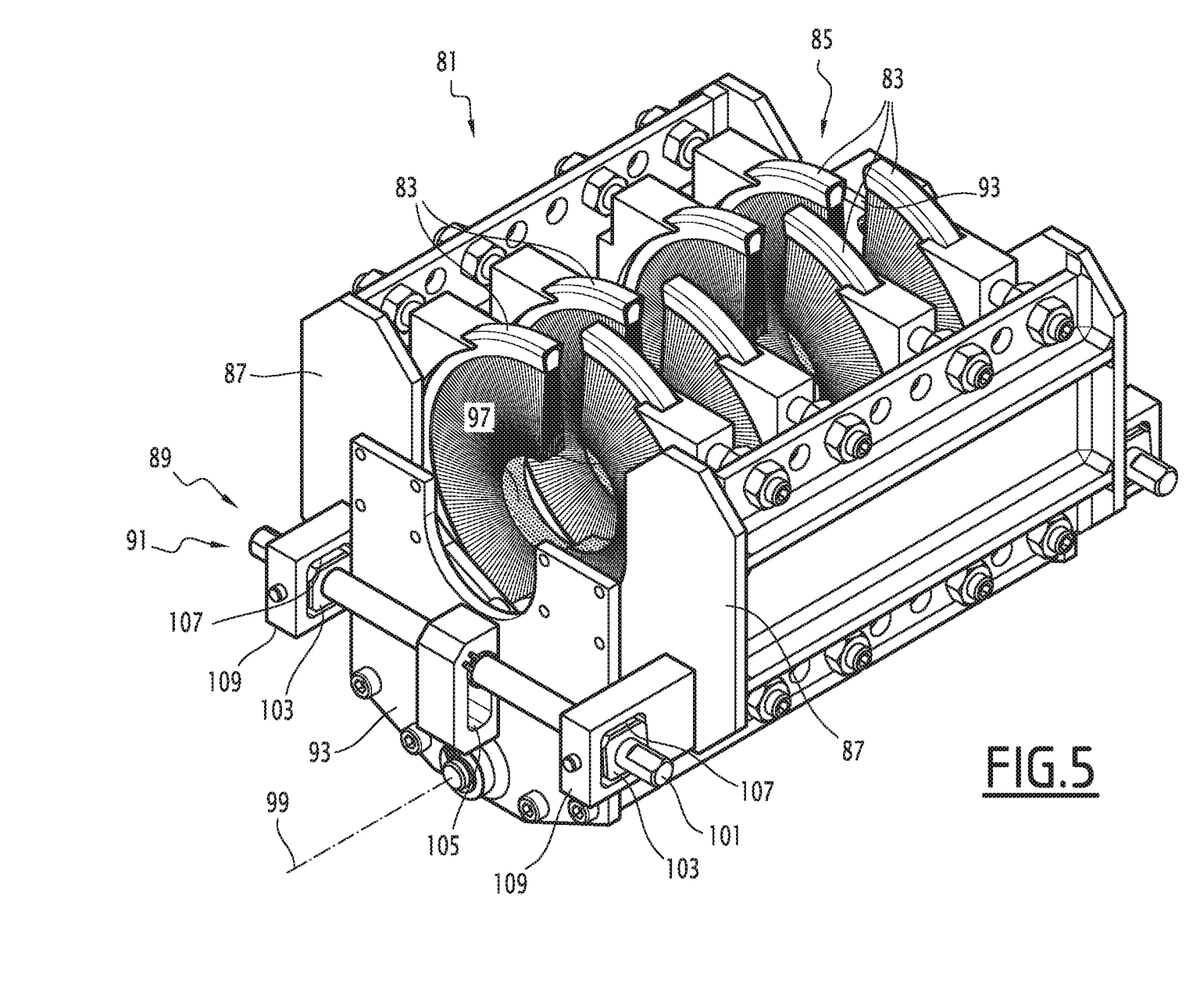
FIG. 5 is a perspective view of a brushing tool.
Figure 6:
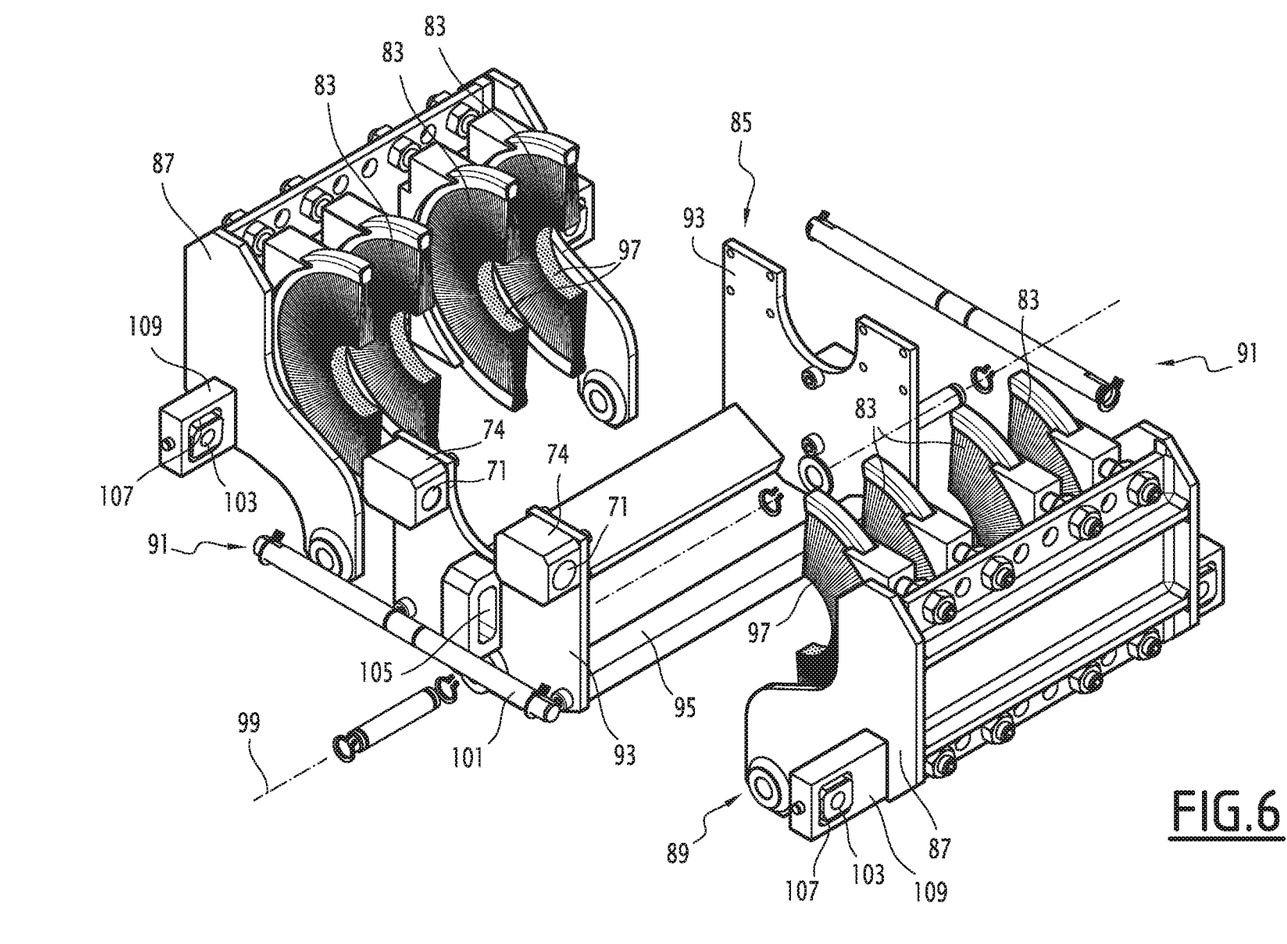
FIG. 6 is an exploded perspective view of the brushing tool of FIG. 5.

A brushing tool 81 is shown in FIGS. 5 and 6. The brushing tool 81-includes at least one brush 83 arranged to brush the outer surface 2 of the tube.

In the illustrated example, the brushing tool 81 bears several brushes 83, having half-ring shapes, diametrically opposite one another relative to the tube 1.

More specifically, the brushing tool 81 includes a central frame 85, two side frames 87 supporting the brushes 83, and a connection 89 of the side frames 87 to the central frame 85.

The central frame 85 includes two end platens 93 situated at the two longitudinal ends of the tool, connected to one another by a longitudinal profile 95.

Each side frame 87 includes a skeleton 96, on which the brushes 83 are mounted.

The brushes 83 are positioned next to one another, regularly spaced apart longitudinally. The brushes 83 connected to a same side frame are placed in respective planes perpendicular to the longitudinal direction, parallel to one another. Each brush 83 is defined toward the tube by a half-circle-shaped edge 97, corresponding to the end of the brush bristles, provided to bear against the tube.

The connection of the side frames 87 to the central frame 85 is a pivoting connection around a longitudinal axis 99 embodied by a mixed line in FIG. 6.

The side frames 87 are thus movable relative to the central frame 85 between respective usage positions, illustrated in FIG. 5, and positions tilted away from the tube. In the usage position, the brushes 83 are in contact by their inner edges 87 with the outer surface of the tube, with a predetermined pressure.

During use, the tool is positioned such that the central frame is placed below the tube, and the two side frames 87 on either side of the tube, such that the brushes 83 connected to the two side frames can brush the entire circumference of the tube.

It is thus possible to brush the entire outer surface of the tube, under the effect of the translation of the tool along the tube.

In their tilted positions, the two side frames 87 are separated from one another, and are separated from the tube. The inner edge 97 of the brushes is no longer in contact with the tube.

It should be noted that the brushes 83 situated at the longitudinal ends of the tool are more flexible than the brushes 83 situated at the center of the tool. This allows more effective brushing of the outer surface of the tube, and better surface finishing.

The brushing tool 81 further comprises a mechanism 91 for locking the side frames 87 in the usage position relative to the central frame 85.

The locking mechanism 91 includes a screw 101 oriented transversely, and two nuts 103 each connected to a side frame 87. Respective tapped orifices of the two nuts 103 are substantially transversely aligned.

The stationary frame 85 also bears an oblong hole 105 oriented vertically, in which a central part of the screw 101 is engaged. The screw 101 has threaded opposite transverse ends, cooperating with the nuts 103.

The nuts 103 are mounted floating in cages 107 arranged in blocks 109 attached on the side frames 87. When the screw 101 is rotated in a first direction, the nuts 103 tend to move transversely away from one another. The side frames 87 are thus driven toward their tilted positions. This movement accompanies a movement of the screw 101, in a vertical plane, downward inside the oblong hole 105. On the contrary, when the screw 101 is rotated in the opposite direction, the nuts 103 tend to come closer to one another, which drives the side frames toward their usage positions.

As shown in particular in FIG. 5, the brushing tool includes two locking mechanisms 91, positioned at its two longitudinal ends.

Figure 7:
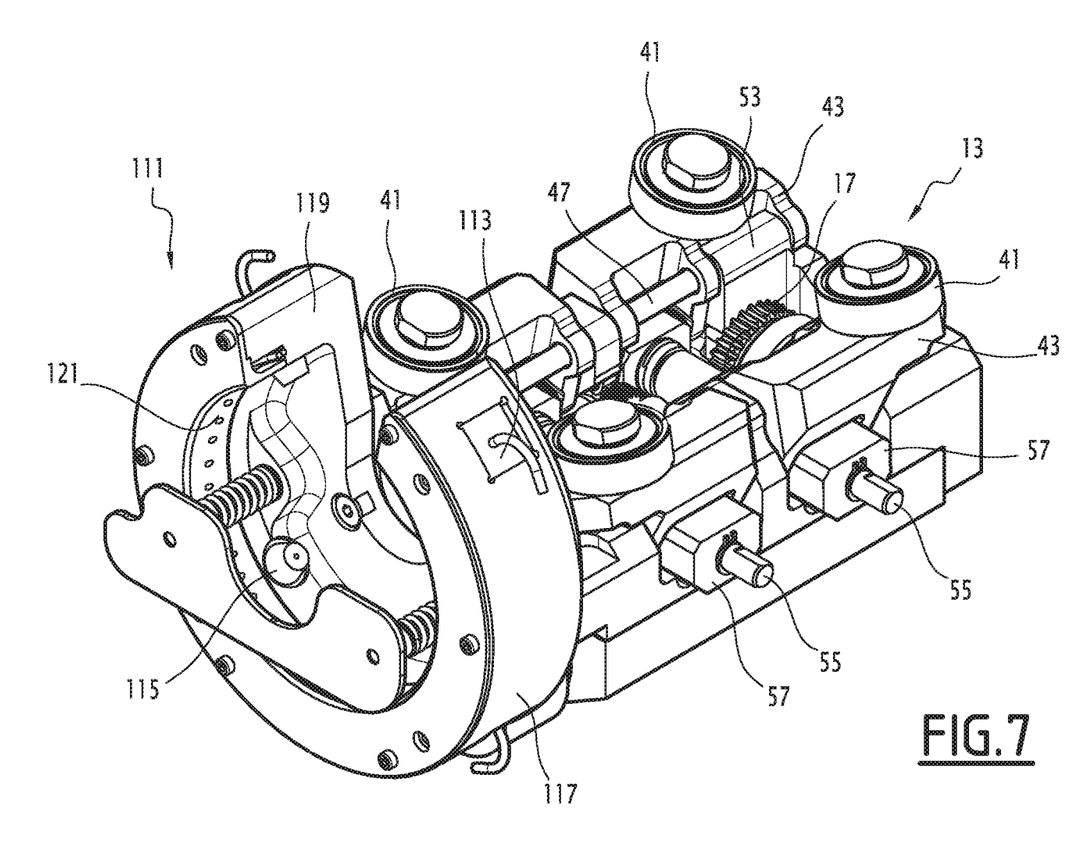
FIG. 7 is a perspective view of an inspection tool mounted on the carrier of FIGS. 3 and 4.

An inspection and marking tool 111 is illustrated in FIG. 7.

This tool includes at least one camera 113, arranged to inspect the outer surface 2 of the tube 1. Preferably, it further includes a device 115 for marking the outer surface.

More specifically, the tool 111 includes a support structure 117 assuming the general form of an interrupted ring. The ring extends over about 300°. It includes an interruption 119, making it possible to engage the tool 111 around the tube, such that the tube is substantially wedged in the axis of the ring. The tool 111 typically include several cameras 113, arranged circumferentially around the structure 117, so as to allow the observation of the outer surface 2 over the entire periphery of the tube. In the illustrated example, the tool 111 includes four cameras 113, positioned at 90° from one another.

Preferably, the tool 111 includes lighting means 121, for example a strip bearing a plurality of diodes, mounted on a radially inner face of the support structure 117. The diodes are circumferentially distributed around the structure 117, so as to be able to illuminate the entire circumference of the tube.

The marking device 115 is mounted on the support structure 117, typically on the radially inner face of the structure 117. It is provided to mark a colored point on the outer surface of the tube when the video inspection using the cameras has shown a zone requiring action. The device 115 is of the type performing marking by spraying paint, or of the type performing marking by contact with a marker tip, or of any other type.

Such marking allows the operators to identify the zones to be addressed quickly and easily.

Alternatively, the inspection tool 111 includes a stationary crown connected to the carrier, and a moving crown supporting the cameras. The moving crown is movable circumferentially around the tube relative to the stationary crown, in order to improve the visual interpretation of the surface of the tube if necessary.

According to another alternative that is not shown, the inspection tool includes two grippers each bearing rollers, connected to the support structure by respective articulations. Each gripper is movable relative to the structure 117 between a position separated from the tube and a close position in which the rollers are in contact with the tube. In the close position, the rollers guide and balance the inspection tool 111 on the tube as it moves along the tube.

Figure 8:
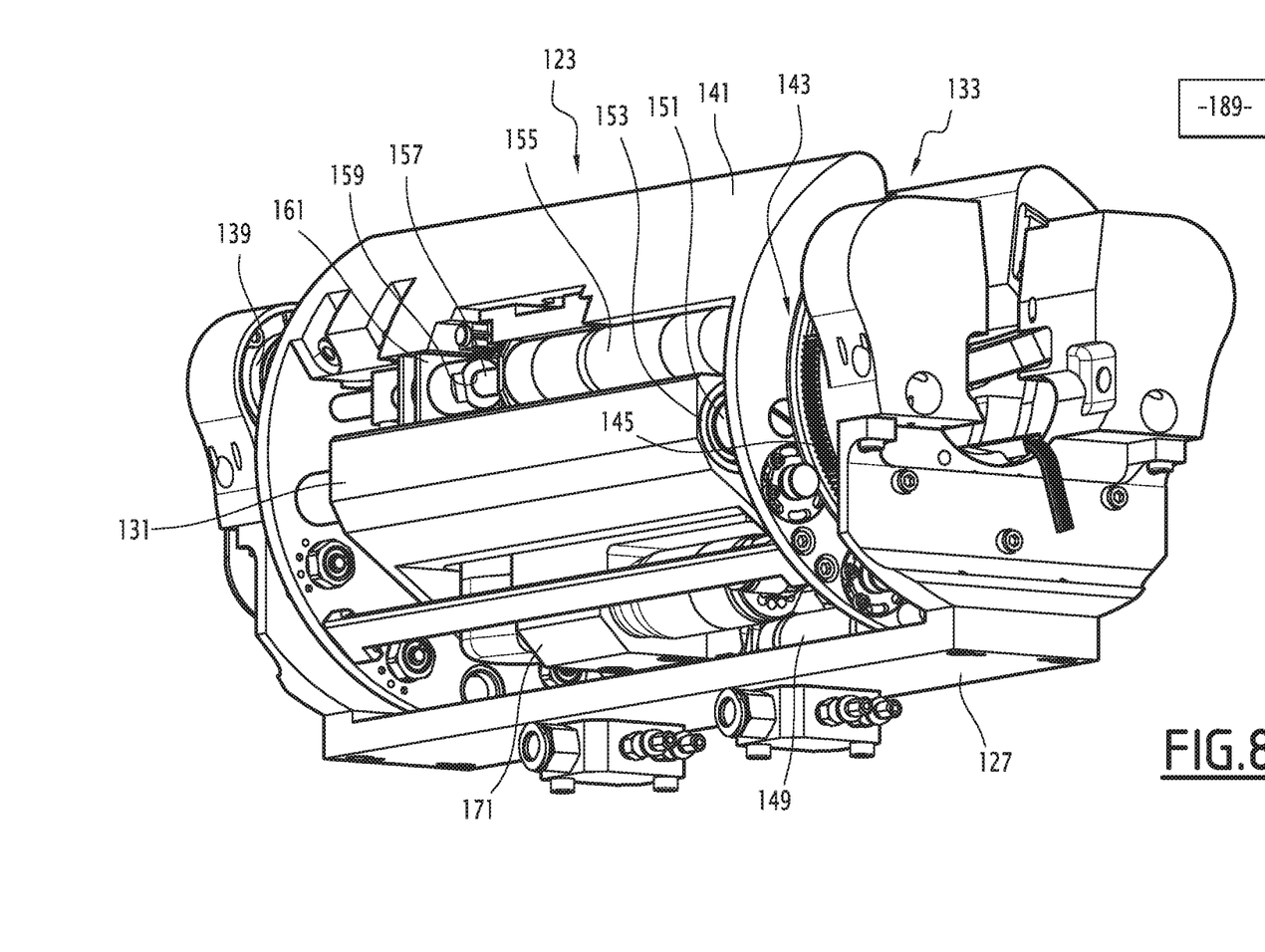
FIG. 8 is a perspective view of a machining tool.
Figure 9:
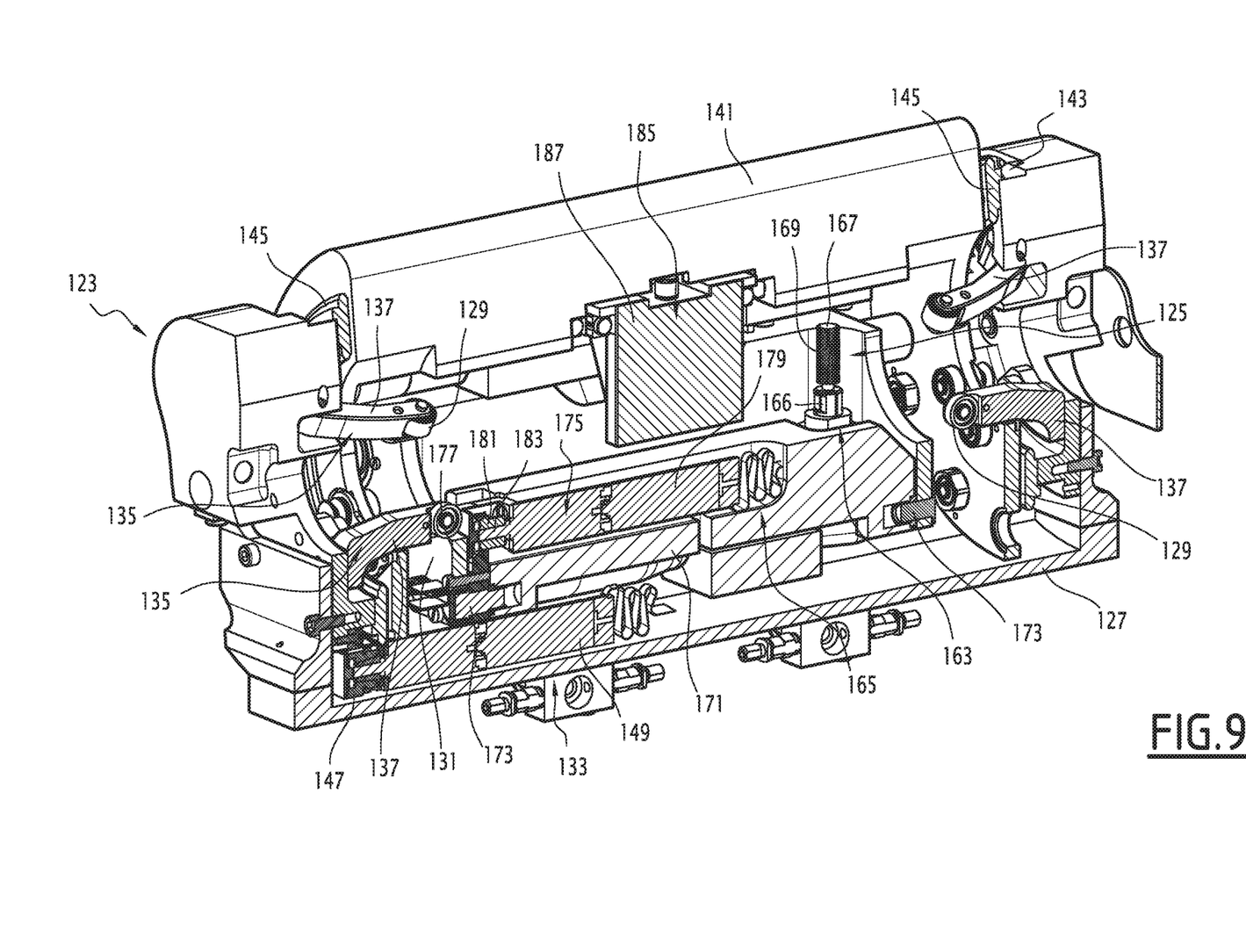
FIG. 9 is a perspective view of the machining tool of FIG. 8, cut in a median longitudinal plane.

The assembly further includes a machining tool 123 shown in FIGS. 8 and 9.

The tool 123 includes at least one machining device 125, able to machine the outer surface 2 of the tube 1, and preferably includes two machining devices 125 that are diametrically opposite one another relative to the tube 1.

More specifically, the machining tool 123 includes:
a frame 127;
a plurality of guide rollers 129 connected to the frame 127, arranged to cooperate with the tube 1 such that the machining tool 123 is supported by the tube and is able to move along the tube;
a carriage 131 carrying the machining devices 125;
a connection 133 of the carriage 131 to the frame 127, arranged so that the carriage is translatable longitudinally relative to the frame 127 along the tube and circumferentially rotatable around the tube.

As shown in FIG. 9, the machining tool 123 includes two sets of rollers 129, allowing supporting of the tool 123 on the tube, at both opposite longitudinal ends of the tool. Each set of rollers includes several rollers 129, distributed circumferentially around the tube.

In the illustrated example, the machining tool 123 includes two sets of three rollers 129.

The machining tool also includes, for each roller, a connection 135 of the roller 129 to the frame 127, at least some connections 135 being able to move the rollers between respective positions separated from the tube, and respective positions in contact with the outer surface of the tube.

As shown in FIG. 9, each connection 135 includes an arm 137 on which the roller 129 is mounted.

In some connections 135, the arm 137 is rigidly fastened to the frame 127.

In other connections 135, the arm 137 is pivotably fastened on the frame 127. In this case, the connection 135 includes a dual-acting jack, making it possible to rotate the arm 137 and the roller 129 around the pivot axis. One of the jacks 139 is shown in FIG. 8.

In the example shown in FIG. 9, the rollers 129 situated in the lower part of the machining tool are stationary. The two rollers 129 situated, at each longitudinal end of the tool, in the upper part, are movable.

In the separated positions of the rollers, it is possible to position the machining tool around the tube.

Once the tool is around the tube, the stationary frame 127 and the stationary rollers 129 are situated below the tube, the moving rollers 129 being situated above the tube.

The connection 133 of the carriage to the frame includes an intermediate frame 141, and a connection 143 of the intermediate frame 141 to the stationary frame 127, arranged such that the frame 141 is circumferentially movable around the tube relative to the stationary frame 127.

The connection 143 includes two racks 145 rigidly fastened to the two opposite longitudinal ends of the intermediate frame, and two toothed wheels 147 each cooperating with a rack. The toothed wheels 147 are rigidly fastened to the output shaft of the motors 149, the motors 149 being rigidly fastened to the stationary frame.

Furthermore, the connection 133 of the carriage to the frame also includes a longitudinal stationary axle 151 rigidly fastened to the intermediate frame 141 (see FIG. 8). The carriage 131 is mounted sliding along the axis 151 by linear bearings 153.

Furthermore, the connection 133 includes a motor 155 rigidly fastened to the carriage 131, rotating a longitudinal worm screw 157. The screw 157 is engaged in threaded orifices 159, arranged in plates 161 rigidly fastened to the intermediate frame 141 (FIG. 8). Thus, when the motor 155 rotates the screw 157 in the clockwise direction, the carriage 131 moves longitudinally in a first direction under the effect of the cooperation between the screw 157 and the threaded orifices 159. When the motor 155 rotates the screw in the opposite direction, the carriage moves longitudinally in the other direction.

In the illustrated example, the machining tool 123 includes two machining devices 125, arranged to be able to machine diametrically opposite respective zones of the outer surface of the tube.

Alternatively, the machining tool includes only one machining device, movable circumferentially around the tube so as to be able to machine the entire periphery of the tube.

According to still another alternative, the machining tool includes more than two machining devices, for example three or more machining devices.

Each machining device 125 comprises a machining member 163 and a connection 165 of the machining member 163 to the carriage 131 able to tilt the machining member 163 relative to the carriage 131 in a plane perpendicular to the tube so as to place the machining member 163 in contact with the outer surface 2 of the tube.

In the illustrated example, the two machining members 163 are connected to the carriage 131 by the same connection 165. The connection 165 is shared by the two machining devices 125. Alternatively, the machining members 163 are connected to the carriage 131 by different connections 165.

In the illustrated example, each machining member 163 is a grinder. It includes an engine block 166 having a rotating output shaft 167, and a machining head, here a cutter 169, fastened to the output shaft 167. The output shaft 167 is perpendicular to the axis of the tube, and travels in a plane perpendicular to the axis of the tube. Alternatively, the machining member is not a grinder, but an abrasive disc or any other type of machining member suitable for removing material from the outer surface of the tube.

The connection 165 of the machining member of the carriage includes a support part 171 to which the engine block 166 is rigidly fastened, a pivot 173 connecting the support 171 to the carriage 131, and a motor means 175 rotating the support 171 around the pivot 173 relative to the carriage 131. The pivot 173 has a longitudinal axis. More specifically, as shown by FIG. 9, the support 171 is connected by both of its opposite longitudinal ends to the carriage 131 by two pivots 173. The pivots 173 are aligned.

The motor means 175 includes a stationary pinion 177 rigidly fastened to the carriage 131, a motor 179 rigidly fastened to the support 171 and a toothed wheel 181 rigidly fastened to the output shaft 183 of the motor 179, and meshing with the stationary pinion 177.

When the motor 179 is activated so as to rotate the toothed wheel 181 in a first direction, the support 171 is in turn rotated around the pivots 173. This causes the machining member 163 to tilt toward the tube, until the machining head 169 is in contact with the outer surface of the tube. When the motor is commanded so as to drive the output shaft and the toothed wheel in opposite directions, the machining member is brought back toward its initial position, and the machining head is no longer in contact with the outer surface of the tube.

Alternatively, the driving movement of the cover is obtained not by pivoting, but by lateral translation of the connection 165 via ball-mounted guides.

The machining tool 123 preferably also includes at least one clamp 185 able to reversibly lock the machining tool in position on the tube. The clamp is in particular visible in FIG. 9.

Typically, the machining tool includes a single clamp. Alternatively, the machining tool includes two clamps or more than two clamps.

The or each clamp 185 typically includes two jaws 187 positioned on either side of the tube, and actuators, not shown, provided to move the two jaws 187 toward one another, reversibly.

As shown in FIG. 9, each jaw 187 is a plate having a bearing surface provided to bear against the tube. The bearing surface is substantially parallel to the longitudinal direction. The two jaws 187 are diametrically opposite one another relative to the tube. The actuators are typically double-acting jacks, provided to push each jaw 187 against the tube, in a direction substantially perpendicular to the axis of the tube.

The clamp 185 is connected to the intermediate frame 141.

Alternatively, the clamp 185 is connected to the carriage 131 or the frame 127.

The movements of all of the elements of the machining tool are controlled remotely via a computer 189. The positions and the movements of the various elements of the machining tool are detected and recorded by coders, which send the information to the computer 189. This is true for the rotational movement of the intermediate frame 141 with respect to the stationary frame 127, the longitudinal movement of the carriage 131 relative to the intermediate frame, and the rotational movement of the machining members 163 relative to the carriage.

The gouging depth, i.e., the machining depth, is controlled by precisely detecting the moment at which the machining tool 163 comes into contact with the outer surface 2 of the tube. To that end, the machining tool is for example equipped with a member for detecting vibrations created by the machining head in contact with the tube, or by a member for detecting an intensity variation of the motor 179 that moves the machining member relative to the tube, or by video means measuring the imprint produced by the machining member in the tube.

Preferably, the machining tool is equipped with a camera whose optical axis is substantially parallel to the axis of the machining member, which makes it possible, if necessary, to position the machining head precisely in the zone to be machined, and to view the work being done on the tube in real time.

The machining tool 123 is suitable for receiving measuring feelers, whether in contact or remote, in place of the machining members 163, to be able to measure a profilometry or surface states of the machine forms.

The cameras and the different measuring and detection means communicate with the computer 189.

Likewise, all of the motors and all of the actuators of the carrier and tools are controlled remotely in the computer 189. All of the coders and all of the detectors on board the carrier and various tools communicate the information or the measurements done to the computer 189.

The operating assembly is thus designed so as to make it possible to restore the outer surface of the tubes, robotically. Human interventions are extremely reduced, and in practice are limited to placing the carrier and tools on the tube, and connecting each of the tools to the carrier.

Such an assembly therefore makes it possible to greatly reduce the doses received by the operators when the operation must take place in an environment where the dose rates are very high.

The method for acting on the outer surface of a tube using the assembly described above will now be outlined.

The method comprises at least the following steps:

placing the carrier 13 and a tool 81, 111, 123 connected to the carrier 13 on the tube 1;

moving the carrier 13 and the tool 81, 111, 123 along the tube 1;

performing at least one inspection or maintenance operation on the outer surface 2 of the tube 1 with the tool 81, 111, 123.

Typically, the method comprises several inspection and/or maintenance operations on the outer surface of the tube, implementing several tools.

However, the intervention may be limited to a single operation: simple brushing of the surfaces, or simple visual examination using the inspection tool, or simple machining of a zone of the outer surface whose position is already known.

Thus, typically, the method comprises one or more of the following steps:

brushing the outer surface 2 of the tube 1 using a brushing tool 81 connected to the carrier 13;

inspecting the outer surface 2 of the tube 1 using an inspection tool 111 connected to the carrier 13;

marking the outer surface 2 of the tube 1 using an inspection tool 111 connected to the carrier 13;

machining the outer surface 2 of the tube 1 using a machining tool 123 connected to the carrier 13.

The step for placing the carrier 13 on the tube 1 is carried out as follows.

Initially, the grippers 43 are in their open positions. An operator approaches the tube with the carrier 13 and engages the tube between the grippers 43. The bottom 25 is oriented downward and rollers 41 are oriented upward. The rolling bodies 17 are situated immediately below the tube. The operator then rotates the screw 55 in a chosen direction to move the blocks 57 away from one another. This results in moving the grippers 43 toward their closed positions, until the tube is pinched between the rolling bodies 17 and the rollers 41. The operator adjusts the force with which the rolling bodies and the rollers pinch the tube, to a predetermined value. Alternatively, the tightening/loosening of the grippers 43 is controlled remotely, motors or jacks replacing the screws 55.

According to another alternative, the placement of the carrier and/or tools on the tubes is done automatically with an arm taking the carrier and/or the tools from the warehouse and positioning them on the tubes. In this case, the tightening/loosening operations are controlled remotely by external jacks or motors.

Typically, the first step is to brush the outer surface of the tube using the brushing tool 81 described above in reference to FIGS. 5 and 6.

The operator therefore first places the brushing tool 81 around the tube 1. Generally, it is already connected to the carrier 13 before placement.

Initially, the side frames 87 are in tilted positions. The operator inserts the tube 1 between the two side frames 87, the central frame 85 being placed below the tube 1. The operator then rotates the screw 91, in an appropriate direction to return the side frames 87 to their usage positions. The inner edges 97 of the brushes then adapt in contact with the outer surface of the tube.

The operator next evacuates the operating zone.

Alternatively, the side frames 87 are closed in the usage position on the tube automatically, controlled remotely. In this case, the screws 91 are replaced by jacks or motors. This remote controlling also makes it possible to open the side frames 87 when the operator intervenes to remove the tool at the end of brushing.

The carrier and the tool are generally placed at a first end of the tube.

Then, an operator located at a distance from the tube 1, in a risk-free zone, remotely commands the movement of the carrier 13 and the brushing tool 81 along the tube 1, via the computer 189.

To do this, he activates the motor 33. The latter rotates the rolling bodies 17. The carrier and the brushing tool thus move over the entire length of the tube, up to an end of the tube opposite the first end.

The arrival of the brushing tool at the second end of the tube is detected for example by an end-of-travel detector mounted on the brushing tool or by an end-of-travel detector mounted on the carrier or by a camera mounted on the carrier or on the brushing tool.

The operator next commands the movement of the carrier 13 and the brushing tool 81 in the opposite direction along the tube 1, so as to return them to the first end of the tube. An operator next separates the brushing tool 81 from the carrier 13, and places the inspection tool 111 on the tube.

Alternatively, the assembly formed by the carrier 13 and the brushing tool 81 is removed from the tube and replaced by another assembly, including another carrier and the inspection tool 111.

To do this, he engages the tube 1 in the notch 119, so as to place the ring structure 117 around the tube. He connects the inspection tool 111 to the carrier 13.

He next evacuates the operating zone.

Once again, an operator remotely commands the movement of the carrier 13 and the inspection tool 111 along the tube, via the computer 189.

During the movement, the lighted band 121 illuminates the outer surface of the tube, and the cameras 113 record images of the outer surface, over the entire periphery of the tube. The cameras 113 send the recorded images to the computer 189.

The sent images are analyzed in real-time by an operator, or on the contrary are recorded and analyzed on a delay.

The coders on board the carrier 13 make it possible to associate each image with a longitudinal position along the tube.

When a damaged zone is identified in the images sent to the cameras, a mark can be made on the outer surface 2 of the tube 1, by the marking device 115. This marking is controlled remotely, via the computer 189. The marking is done immediately if the images are analyzed as they are sent, or on the contrary the marking may be done later, by bringing the carrier 13 back to be identified defective zone.

For example, the images can be recorded during the outbound journey of the inspection tool 111, from the first end of the tube to the second, and the visual references may be affixed during the return journey.

The arrival of the carrier and the inspection tool at the second end of the tube is detected for example by an end-of-travel detector mounted on the inspection tool or by an end-of-travel detector mounted on the carrier or by a camera mounted on the tool or the carrier.

Once the carrier 13 and the inspection tool 111 have returned to the first end of the tube, an operator disassembles the inspection tool 111. He next places the machining tool 123 around the tube, and connects it to the carrier 13.

Alternatively, the assembly made up of the carrier and the inspection tool 111 is removed from the tube, and replaced by an assembly made up of still another carrier and the machining tool 123.

To that end, the rollers 139 of the machining tool are initially in their respective positions separated from the tube. The operator places the machining tool 123 such that the frame 127 is placed below the tube. He engages the tube between the rollers 129, then commands the movement of the rollers 129 to their positions in contact with the tube.

Initially, the clamp 185 is open, and the machining member(s) 125 are not in contact with the outer surface 2 of the tube 1.

The operator next evacuates the operating zone. An operator next remotely commands the movement of the carrier 13 and the machining tool 123 along the tube 1 until the machining tool is placed at one of the zones to be machined of the outer surface 2 of the tube 1.

The coders equipping the carrier make it possible to place the machining member 123 precisely at the zones previously identified with the inspection tool 111.

Then, the position of each machining device 125 is finely adjusted relative to the zone to be machined, using the connection of the carriage 131 to the frame 127. The motor 149 is used to move the intermediate frame 141 relative to the stationary frame 127. The motor 155 is used to move the carriage 131 relative to the intermediate frame 141.

This fine placement is done by the operator via the computer 189, in particular using cameras on board the machining tool.

The machining tool 123 is next locked in position on the tube 1, through the clamp 185. The jacks are actuated so as to grip the jaws 187 against the tube 1, on either side of the tube.

The machining device(s) 125 are next activated, and the operator commands the movement of each machining member 163 relative to the carriage 131 via the computer 189 until the or each machining head 169 is in contact with the zone to be machined of the outer surface of the tube. The placement of the machining head 169 in contact with the outer surface of the tube is detected either by the onboard camera or by the detectors provided to that end, as described above.

The operator commands the continued movement of the machining head(s) 169 until the required machining depth is reached.

If necessary, the carriage 131 is moved longitudinally while the machining head 169 is in action, which for example makes it possible to produce shapes radiated by interpolation of the two working axes (longitudinal movement axis along the tube, diving axis of the head perpendicular to the axis of the tube).

Once the required depth has been reached, the operator uses the computer 189 to command the separation of the machining head(s) from the tube. If necessary, he next moves the carriage 131 longitudinally, to place the or each machining head in an appropriate position to machine another part of the same zone if needed. He can also loosen the clamp 185 and circumferentially move the intermediate frame 141 and the carriage 131 around the tube, using the motor 149.

After having tightened the clamp once again, he actuates the motor 179 so as to place the or each machining head back in contact with the zone to be machined.

Once the first zone has been completely machined, the operator moves the carrier and the machining tool to another zone to be machined, and so forth.

What is claimed is:

1. An assembly for acting on an outer surface of a tube, the assembly comprising:
    a carrier movable along the tube;
    at least one inspection or maintenance tool, connected to the carrier;
    the carrier comprising:
        at least one rolling body, placed in contact with the outer surface of the tube;
        an actuator, arranged to rotate the rolling body relative to the tube, so as to propel the carrier along the tube by cooperation between the rolling body and the outer surface of the tube; and
        a connector for connecting the carrier to the tube, arranged so that the tube absorbs at least 50% of the weight of the carrier and the tool,
    wherein the carrier comprises a chassis to which the at least one rolling body is connected, the connector comprising at least one roller connected to the chassis, arranged so as to pinch the tube between the at least one roller and the at least one rolling body with a predetermined force,
    wherein the at least one rolling body has a nonslip coating, the nonslip coating, the predetermined force and a maximum motor torque that is transmittable by the actuator to the at least one rolling body being chosen so that the carrier and the tool can be kept immobile around a vertical tube segment.

2. The assembly according to claim 1, wherein the connector includes at least one gripper bearing at least one of the rollers, and a connection of the gripper to the chassis arranged so that the gripper is movable between an open position in which the carrier is separable from the tube, and a closed position in which the tube is pinched between the at least one roller and the at least one rolling body.

3. The assembly according to claim 1, wherein the carrier comprises a coder configured for determining a current position of the carrier along the tube.

4. The assembly according to claim 1, wherein the assembly comprises a connection configured for connecting the carrier to the at least one tool, the connector imparting at least one degree of freedom to the at least one tool relative to the carrier.

5. The assembly according to claim 1, wherein the at least one tool includes a brushing tool including at least one brush arranged to brush the outer surface of the tube.

6. The assembly according to claim 5, wherein the brushing tool includes several brushes having half-ring shapes, diametrically opposite one another relative to the tube.

7. The assembly according to claim 1, wherein the at least one tool includes an inspection tool including at least one camera, arranged to inspect the outer surface of the tube.

8. The assembly according to claim 7, wherein the inspection tool includes a device for marking the outer surface.

9. The assembly according to claim 1, wherein the at least one tool includes a machining tool including at least one machining device configured to machine the outer surface of the tube.

10. The assembly according to claim 9, wherein the machining tool includes:
a frame;
a plurality of guide rollers connected to the frame, arranged to cooperate with the tube such that the machining tool is supported by the tube and is configured to move along the tube;
a carriage carrying the machining devices;
a connection of the carriage to the frame, arranged so that the carriage is translatable longitudinally relative to the frame along the tube and circumferentially rotatable around the tube.

11. The assembly according to claim 10, wherein the machining tool includes connections of the rollers to the frame, at least some connections being configured to move the rollers between respective positions separated from the tube, and respective positions in contact with the outer surface of the tube.

12. The assembly according to claim 10, wherein the at least one machining device includes a machining member and a connection of the machining device to the carriage configured to tilt the machining member relative to the carriage in a plane perpendicular to the tube so as to place the machining member in contact with the outer surface of the tube.

13. The assembly according to claim 9, wherein the machining tool includes at least one clamp configured to reversibly lock the machining tool in position on the tube.

14. An assembly for acting on an outer surface of a tube, the assembly comprising:
a carrier movable along the tube;
at least one inspection or maintenance tool, connected to the carrier;
the carrier comprising:
at least one rolling body, placed in contact with the outer surface of the tube;
an actuator, arranged to rotate the rolling body relative to the tube, so as to propel the carrier along the tube by cooperation between the rolling body and the outer surface of the tube; and
a connector for connecting the carrier to the tube, arranged so that the tube absorbs at least 50% of the weight of the carrier and the tool,
wherein the carrier comprises a coder configured for determining a current position of the carrier along the tube.

15. An assembly for acting on an outer surface of a tube, the assembly comprising:
a carrier movable along the tube;
at least one inspection or maintenance tool, connected to the carrier;
the carrier comprising:
at least one rolling body, placed in contact with the outer surface of the tube;
an actuator, arranged to rotate the rolling body relative to the tube, so as to propel the carrier along the tube by cooperation between the rolling body and the outer surface of the tube; and
a connector for connecting the carrier to the tube, arranged so that the tube absorbs at least 50% of the weight of the carrier and the tool,
wherein the at least one tool includes a machining tool including at least one machining device configured to machine the outer surface of the tube,
wherein the machining tool includes:
a frame;
a plurality of guide rollers connected to the frame, arranged to cooperate with the tube such that the machining tool is supported by the tube and is configured to move along the tube;
a carriage carrying the machining devices;
a connection of the carriage to the frame, arranged so that the carriage is translatable longitudinally relative to the frame along the tube and circumferentially rotatable around the tube.

16. The assembly according to claim 15, wherein the carrier comprises a chassis to which the at least one rolling body is connected, the connector comprising at least one roller connected to the chassis, arranged so as to pinch the tube between the at least one roller and the at least one rolling body with a predetermined force.

17. The assembly according to claim 16, wherein the at least one rolling body has a nonslip coating, the nonslip coating, the predetermined force and a maximum motor torque that is transmittable by the actuator to the at least one rolling body being chosen so that the carrier and the tool can be kept immobile around a vertical tube segment.

* * * * *